United States Patent
Tamaki

(10) Patent No.: US 11,592,807 B2
(45) Date of Patent: Feb. 28, 2023

(54) MANUFACTURING DEFECT FACTOR SEARCHING METHOD AND MANUFACTURING DEFECT FACTOR SEARCHING APPARATUS

(71) Applicant: Hitachi, Ltd, Tokyo (JP)

(72) Inventor: Kenji Tamaki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 113 days.

(21) Appl. No.: 17/220,145

(22) Filed: Apr. 1, 2021

(65) Prior Publication Data

US 2021/0318672 A1  Oct. 14, 2021

(30) Foreign Application Priority Data

Apr. 8, 2020 (JP) .............................. JP2020-69850

(51) Int. Cl.
  *G05B 19/418* (2006.01)
  *G06K 9/62* (2022.01)

(52) U.S. Cl.
  CPC ... *G05B 19/41875* (2013.01); *G05B 19/4183* (2013.01); *G06K 9/6267* (2013.01)

(58) Field of Classification Search
  CPC .......... G05B 19/41875; G05B 19/4183; G05B 2219/32191; G05B 2219/32194; G06K 9/6267; G06V 10/44; G06V 20/52; Y02P 90/02
  See application file for complete search history.

(56) References Cited

U.S. PATENT DOCUMENTS

| | | | | |
|---|---|---|---|---|
| 5,715,181 A | * | 2/1998 | Horst | H01L 22/20 700/109 |
| 6,061,640 A | * | 5/2000 | Tanaka | G05B 19/41875 700/109 |
| 7,610,168 B2 | * | 10/2009 | Isumi | G06T 7/0008 702/179 |
| 2005/0027487 A1 | * | 2/2005 | Iyer | G06Q 30/02 702/185 |
| 2021/0374634 A1 | * | 12/2021 | Okimoto | G05B 19/4065 |

FOREIGN PATENT DOCUMENTS

EP  1 052 586 A2  11/2000
JP  2001-76054 A  3/2001

* cited by examiner

*Primary Examiner* — Christopher E. Everett
(74) *Attorney, Agent, or Firm* — Crowell & Moring LLP

(57) ABSTRACT

A manufacturing defect factor searching method includes: classifying manufacturing monitoring data into a set of non-defective products having an inspection result indicating a non-defective product and a set of defective products having the inspection result indicating a defective product, in accordance with a correspondence relationship between the manufacturing monitoring data and product inspection data indicating the inspection result of the product manufactured in the manufacturing line, the manufacturing monitoring data being collected from a manufacturing line of a product and being multivariate; estimating, for each item of the manufacturing monitoring data, a mixture distribution function approximating to a statistical distribution of each of the set of non-defective products and the set of defective products; resolving the mixture distribution function into components; and generating a list of items including a resolved component having a correlation with a manufacturing quality defect from among items of the manufacturing monitoring data.

8 Claims, 9 Drawing Sheets

FIG. 3

| PRODUCT NO. | MANUFACTURING CONDITION MONITORING DATA ITEM | | | FINAL PRODUCT INSPECTION RESULT |
|---|---|---|---|---|
| | x_1 | x_2 | x_p | |
| 1 | -0.9310 | 0.8668 | ... | NON-DEFECTIVE PRODUCT |
| ... | ... | ... | ... | ... |
| n | 0.0344 | 0.0011 | ... | DEFECTIVE PRODUCT |
| ... | ... | ... | ... | ... |
| N | 0.1034 | 0.0107 | ... | NON-DEFECTIVE PRODUCT |

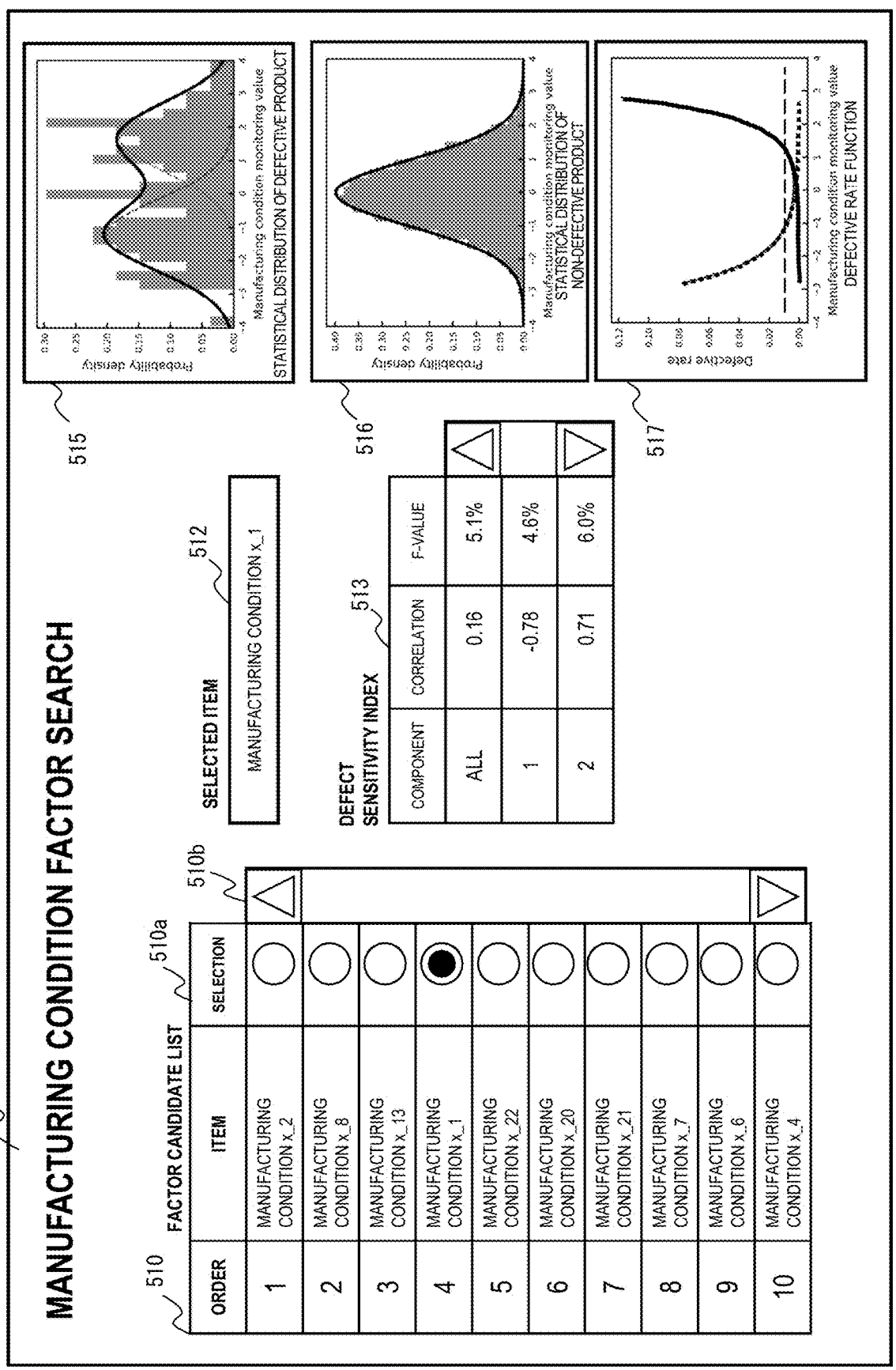

FIG. 7

| PRODUCT NO. | MANUFACTURING CONDITION MONITORING DATA ITEM | | | MANUFACTURING ATTRIBUTE ITEM | FINAL PRODUCT INSPECTION ITEM |
|---|---|---|---|---|---|
| | x_1 | x_2 | x_p | a | |
| 1 | -0.9310 | 0.8668 | ... | a_1 | NON-DEFECTIVE PRODUCT |
| ... | ... | ... | ... | ... | ... |
| n | 0.0344 | 0.0011 | ... | a_2 | DEFECTIVE PRODUCT |
| ... | ... | ... | ... | ... | ... |
| N | 0.1034 | 0.0107 | ... | a_1 | NON-DEFECTIVE PRODUCT |

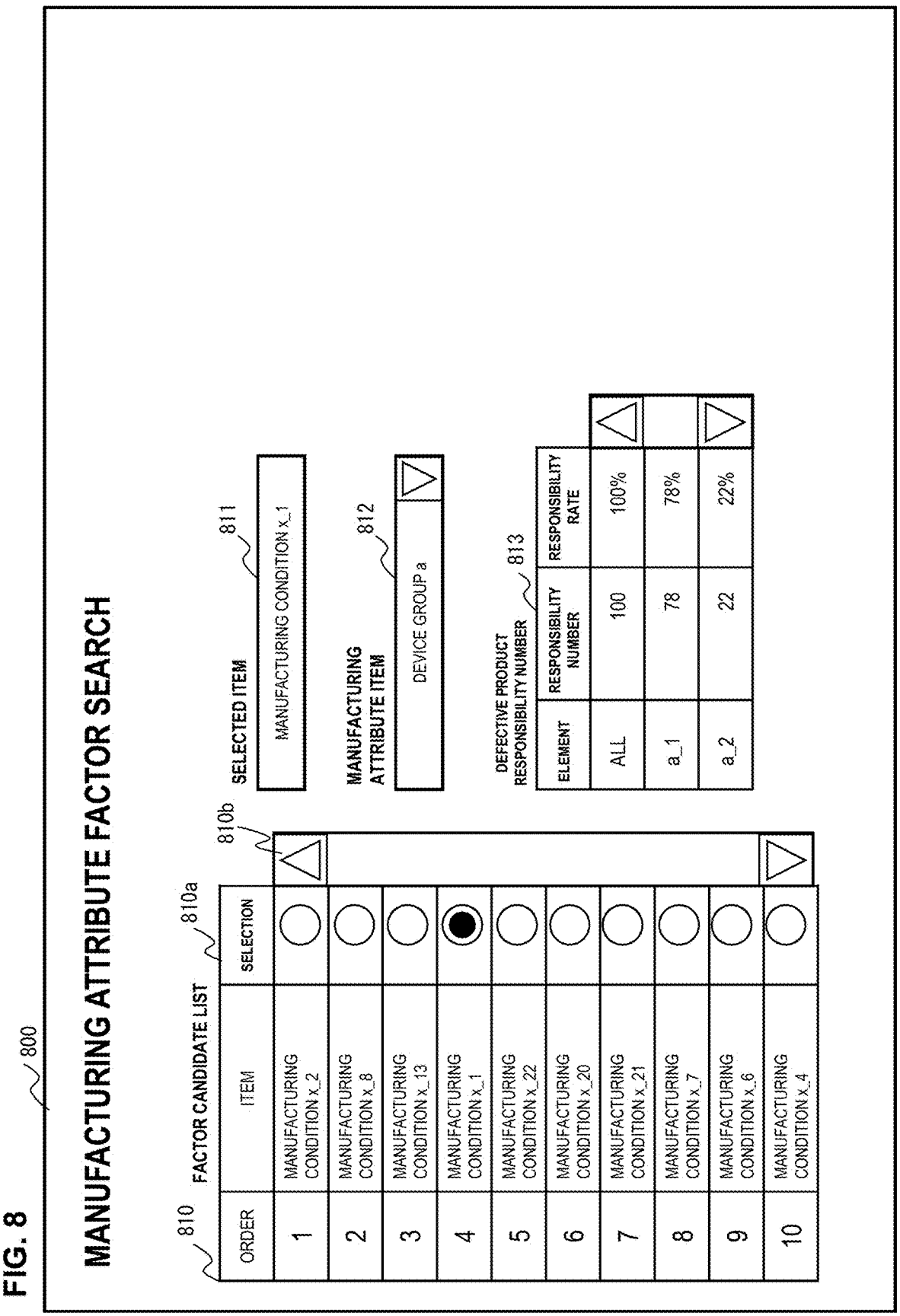

DEFECTIVE PRODUCT

NON-DEFECTIVE PRODUCT

DEFECTIVE PRODUCT

NON-DEFECTIVE PRODUCT

MANUFACTURING DEFECT FACTOR SEARCHING METHOD AND MANUFACTURING DEFECT FACTOR SEARCHING APPARATUS

BACKGROUND

Technical Field

The present invention relates to a manufacturing defect factor searching method and a manufacturing defect factor searching apparatus.

Related Art

In order to improve product quality in a manufacturing line for molding, machining, and assembling products or parts that configure a product, it is requested that manufacturing monitoring data be collected from the manufacturing line, statistical analysis be performed in association with a result of inspecting a final product, a factor of a deterioration in quality of products be searched for, and measures to remove or prevent the factor be taken. Here, the manufacturing monitoring data includes manufacturing condition monitoring data, such as pressure or temperature, of a manufacturing device that performs molding, machining, and assembly, and intermediate product inspection data that serves as a result of inspecting parts or intermediate products during manufacturing.

As a statistical analysis method, for example, JP 2001-76054 A describes a method for approximating variations in a value of an arbitrary item (a parameter) of manufacturing monitoring data of a product sample by using a statistical distribution function (a normal distribution function, a uniform distribution function, a Weibull distribution function, or the like), and obtaining a mathematical analytic value such as a standard deviation.

SUMMARY

However, in a case where the same task is shared by a plurality of manufacturing devices in each process that configures a manufacturing line, individual manufacturing devices that perform the same task have values different from each other with respect to a common manufacturing monitoring data item, and can be a variations generating factor.

Hereinafter, a set of a plurality of manufacturing devices to be used to play the same role in a manufacturing line is defined as a "manufacturing attribute". The manufacturing attribute is a manufacturing discrete variable that includes a plurality of elements that plays the same role. Examples of the manufacturing attribute include a plurality of operators in charge of the same task, a plurality of supply sources that supplies the same material or part to the manufacturing line, and the like, in addition to the plurality of manufacturing devices.

Respective elements of a manufacturing attribute that includes a plurality of elements that plays the same role can be individual variations generating factors with respect to an arbitrary item (a parameter) of manufacturing monitoring data collected from a manufacturing line having the manufacturing attribute. Therefore, a statistical distribution of the respective elements has a multi-peak shape in some cases, has a shape having a great skewness (inclination) in some cases, has a shape having a great or small kurtosis in some cases, or has a complicated shape including a combination of the shapes described above in some cases.

In such cases, a factor of a manufacturing defect fails to be searched form with high precision in a conventional method for applying a normally used statistical distribution function and obtaining a mathematical analytic value such as a standard deviation.

Furthermore, in order to make the conventional method effective, a method for performing in advance preprocessing for dividing manufacturing monitoring data into pieces for respective manufacturing attribute elements (stratification processing) has been proposed. In order to perform the preprocessing, a large amount of manufacturing monitoring data needs to be accumulated in advance, and it is difficult to promptly search for a factor in response to the occurrence of a manufacturing quality defect or search for a factor of a manufacturing quality defect of a product having a small production volume.

The present invention has been made in view of the points described above, and it is an object of the present invention to enable the high-precision search for a manufacturing monitoring data item having a high sensitivity to a defective product.

The present application includes a plurality of means for solving at least some of the problems described above, and an example of the means is described below.

In order to solve the problems described above, a manufacturing defect factor searching method in one aspect of the present invention includes: classifying manufacturing monitoring data into a set of non-defective products in which an inspection result indicates a non-defective product and a set of defective products in which the inspection result indicates a defective product, in accordance with a correspondence relationship between the manufacturing monitoring data and product inspection data, the manufacturing monitoring data being collected from a manufacturing line of a product and being multivariate, the product inspection data indicating the inspection result of the product manufactured in the manufacturing line; estimating a mixture distribution function for each item of the manufacturing monitoring data, the mixture distribution function approximating to a statistical distribution of each of the set of non-defective products and the set of defective products; resolving the mixture distribution function into components; and generating a list of items including a resolved component having a strong relationship with a manufacturing quality defect from among items of the manufacturing monitoring data.

According to the present invention, a manufacturing monitoring data item having a high sensitivity to a defective product can be searched for with high precision.

Problems, configurations, and effects that are different from the above will be apparent from the description below of an embodiment.

BRIEF DESCRIPTION OF DRAWINGS

FIG. 3 is a diagram illustrating an example of a data table to be used in the manufacturing condition monitoring data defect factor item searching processing;

FIGS. 4A, 4B, and 4C are diagrams that respectively illustrate a statistical distribution of a defective product, a statistical distribution of a non-defective product, and a defective rate function;

FIG. 5 is a diagram illustrating a display example of a search result screen in the manufacturing condition monitoring data defect factor item searching processing;

FIG. 7 is a diagram illustrating an example of a data table to be used in the manufacturing attribute item element searching processing;

FIG. 8 is a diagram illustrating a display example of a search result screen in the manufacturing attribute item element searching processing; FIGS. 9A, 9B, 9C, and 9D are diagrams that respectively illustrate a two-dimensional frequency distribution of a defective product, a two-dimensional resolved component function of a defective product, a two-dimensional frequency distribution of a non-defective product, and a two-dimensional resolved component function of a non-defective product.

DETAILED DESCRIPTION

An embodiment of the present invention is described below with reference to the drawings. Note that, in all of the drawings for explaining the embodiment, in principle, the same member is denoted by the same reference sign, and the repetitive description thereof is omitted. Furthermore, needless to say, in the embodiment described below, its components (also including element steps or the like) are not necessarily essential, unless otherwise specified, or excluding a case where the components are obviously considered to be essential and other cases. Furthermore, when "be made up of A", "be constituted by A", "have A", or "include A" is used, it is needless to say that other elements are not excluded, excluding a case where only A is particularly specified as an element and other cases. Similarly, in the embodiment described below, when a shape, a positional relationship, or the like of components or the like is referred to, shapes, positional relationships, or the like that approximate to or are similar to the shape, the positional relationship, or the like that has been referred to are substantially included, unless otherwise specified, or excluding a case where it is obvious that this is not the case in principle and other cases.

<Configuration Example of Manufacturing Defect Factor Searching Apparatus 10 According to Embodiment of the Present Invention>

Figure 1:
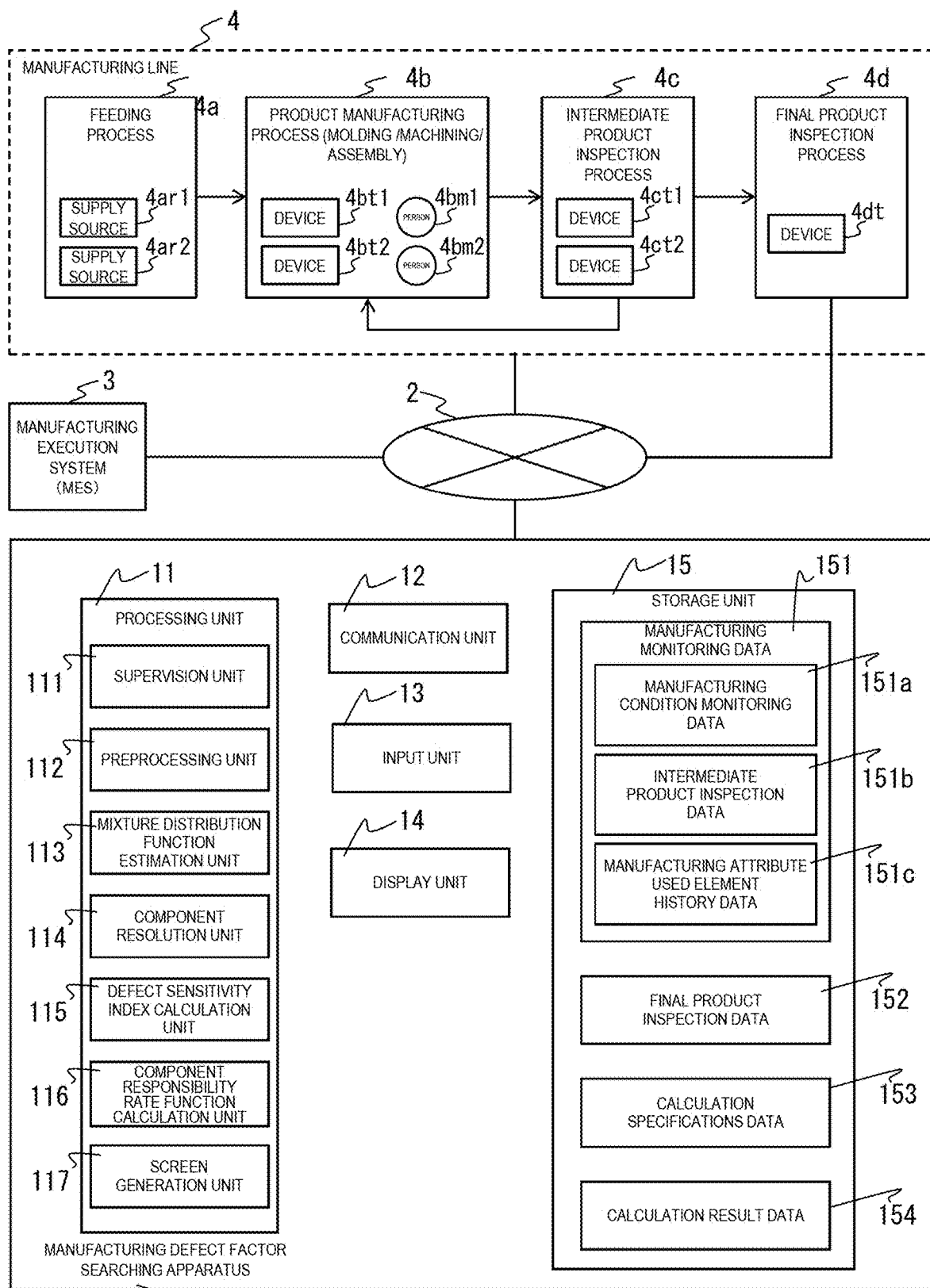
FIG. 1 is a diagram illustrating a configuration example of a manufacturing defect factor searching apparatus according to an embodiment of the present invention.

FIG. 1 illustrates a configuration example of a manufacturing defect factor searching apparatus 10 according to an embodiment of the present invention.

The manufacturing defect factor searching apparatus 10 collects manufacturing monitoring data from a manufacturing line 4 via a network 2, and searches for a factor of a deterioration in quality that has occurred in a product, on the basis of the collected manufacturing monitoring data.

The network 2 is a bidirectional communication network represented by the Internet, a portable telephone communication network, or the like. A manufacturing execution system (MES) 3 is connected to the manufacturing line 4 via the network 2, and performs grasping and managing a state of each process in the manufacturing line 4, issuing an instruction to an operator, assisting the operator, or the like.

The manufacturing line 4 includes four processes, a feeding process 4a, a product manufacturing process 4b, an intermediate product inspection process 4c, and a final product inspection process 4d.

The feeding process 4a is a process of feeding material or a part into the manufacturing line 4. In the feeding process 4a, a plurality of supply sources Oar (in the example of FIG. 1, two supply sources 4ar1 and 4ar2) that supplies the same material or part is present as a manufacturing attribute.

The product manufacturing process 4b is a process of performing a task, such as molding, machining, or assembly, on material or a part. In the product manufacturing process 4b, a plurality of manufacturing devices 4bt (in the example of FIG. 1, two manufacturing devices 4bt1 and 4bt2) that performs the same task, and a plurality of operators (persons) 4bm (in the example of FIG. 1, two operators 4bm1 and 4bm2) are disposed as manufacturing attributes.

The intermediate product inspection process 4c is a process of inspecting an intermediate product that has been output in the product manufacturing process 4b. In the intermediate product inspection process 4c, a plurality of inspection devices 4ct (in the example of FIG. 1, two inspection devices 4ct1 and 4ct2) that conducts the same inspection is disposed as a manufacturing attribute.

The final product inspection process 4d is a process of inspecting a final product that has been manufactured by repeating the product manufacturing process 4b and the intermediate product inspection process 4c. In the final product inspection process 4d, an inspection device 4dt that inspects a final product and outputs, as final product inspection data, a result indicating whether the final product is defective is disposed. The final product inspection data may be binary data indicating either a non-defective product or a defective product, or may be numerical data indicating a degree of defectiveness.

The manufacturing defect factor searching apparatus 10 includes a general computer that includes a processor such as a central processing unit (CPU), a memory, a storage, a communication module, an input device, a display device, or the like. The manufacturing defect factor searching apparatus 10 includes respective function blocks, a processing unit 11, a communication unit 12, an input unit 13, a display unit 14, and a storage unit 15.

The processing unit 11 includes a processor included in a computer, and controls the entirety of the manufacturing defect factor searching apparatus 10. The processing unit 11 includes respective function blocks, a supervision unit 111, a preprocessing unit 112, a mixture distribution function estimation unit 113, a component resolution unit 114, a defect sensitivity index calculation unit 115, a component responsibility rate function calculation unit 116, and a screen generation unit 117. These function blocks are implemented by executing a predetermined program by using the processor serving as the processing unit 11.

The communication unit 12 includes the communication module included in the computer, is connected to the manufacturing line 4 via the network 2, and receives various types of data. The input unit 13 includes an input device, such as a keyboard, a mouse, or a touch panel, that is included in the computer, receives various operation inputs from a user, and performs an output to the processing unit 11. The display unit 14 includes a display device, such as a liquid crystal display, that is included in the computer, and displays a search result screen 500 (FIG. 5) or the like.

The storage unit 15 includes the memory and the storage that are included in the computer. Manufacturing monitoring data 151, final product inspection data 152, calculation specifications data 153, and calculation result data 154 are stored in the storage unit 15.

The manufacturing monitoring data 151 is collected from the manufacturing line 4. The manufacturing monitoring data 151 includes manufacturing condition monitoring data 151a, intermediate product inspection data 151b, and manufacturing attribute used element history data 151c.

The manufacturing condition monitoring data 151a is a measurement value of temperature during a molding task, speed during a machining task, torque during an assembly task, or the like in the product manufacturing process 4b. The intermediate product inspection data 151b is a measurement value of dimensions, weight, or the like of an intermediate product or a part that have/has been measured in the intermediate product inspection process 4c. The manufacturing attribute used element history data 151c is a use history of an element (the supply source 4ar1 or 4ar2) to be switched and used of a manufacturing attribute in the feeding process 4a, an element (the manufacturing device 4bt1 or 4bt2) to be switched and used of a manufacturing attribute in the product manufacturing process 4b, an element in charge (the operator 4bm1 or 4bm2) to be switched of a manufacturing attribute in the product manufacturing process 4b, an element (the inspection device 4ct1 or 4ct2) to be switched and used of a manufacturing attribute in the intermediate product inspection process 4c, or the like.

The final product inspection data 152 is collected in the final product inspection process 4d of the manufacturing line 4. The calculation specifications data 153 includes calculation formulae of various functions, their coefficients, or the like, and is stored in advance in the storage unit 15. The calculation result data 154 is calculation results of various functions. Note that data that is different from these may be stored in the storage unit 15.

The supervision unit 111 of the processing unit 11 supervises processing performed by each of the preprocessing unit 112, the mixture distribution function estimation unit 113, the component resolution unit 114, the defect sensitivity index calculation unit 115, the component responsibility rate function calculation unit 116, and the screen generation unit 117.

The preprocessing unit 112 collects the manufacturing monitoring data 151 from the manufacturing line 4 via the communication unit 12, and stores the manufacturing monitoring data 151 in the storage unit 15. Furthermore, the preprocessing unit 112 collects the final product inspection data 152 in the final product inspection process 4d of the manufacturing line 4 via the communication unit 12, and stores the final product inspection data 152 in the storage unit 15. Moreover, the preprocessing unit 112 generates a data table 300 (FIG. 3) or 700 (FIG. 7) on the basis of the manufacturing monitoring data 151 and the final product inspection data 152, and performs preprocessing.

Note that each record of the manufacturing monitoring data 151 and the final product inspection data 152 records identification information (for example, a product number) that has been given in order for the manufacturing execution system 3 to uniquely manage a product. Accordingly, a record of the manufacturing monitoring data 151 and a record of the final product inspection data 152 for an arbitrary product can be easily associated with each other.

The mixture distribution function estimation unit 113 estimates a mixture distribution function for a frequency distribution of a value of each item in manufacturing monitoring data of each of a set for which an inspection result of a final product indicates a non-defective product and a set for which the inspection result indicates a defective product. The component resolution unit 114 resolves the mixture distribution function into components, and generates one resolved component function or a plurality of resolved component functions. The defect sensitivity index calculation unit 115 calculates a component defective rate function for a resolved component function of each component k of the estimated mixture distribution functions of a defective product, and calculates a defect sensitivity index indicating a defect sensitivity of each of the components with respect to each item of the manufacturing condition monitoring data 151a. The component responsibility rate function calculation unit 116 calculates a responsibility rate function of each of the components with respect to each of the items of the manufacturing condition monitoring data 151a.

The screen generation unit 117 generates a video signal for displaying a search result screen 500 (FIG. 5) or 800 (FIG. 8), and causes the display unit 14 to conduct a display.

<Manufacturing Condition Monitoring Data Defect Factor Item Searching Processing Performed by Manufacturing Defect Factor Searching Apparatus 10>

Figure 2:
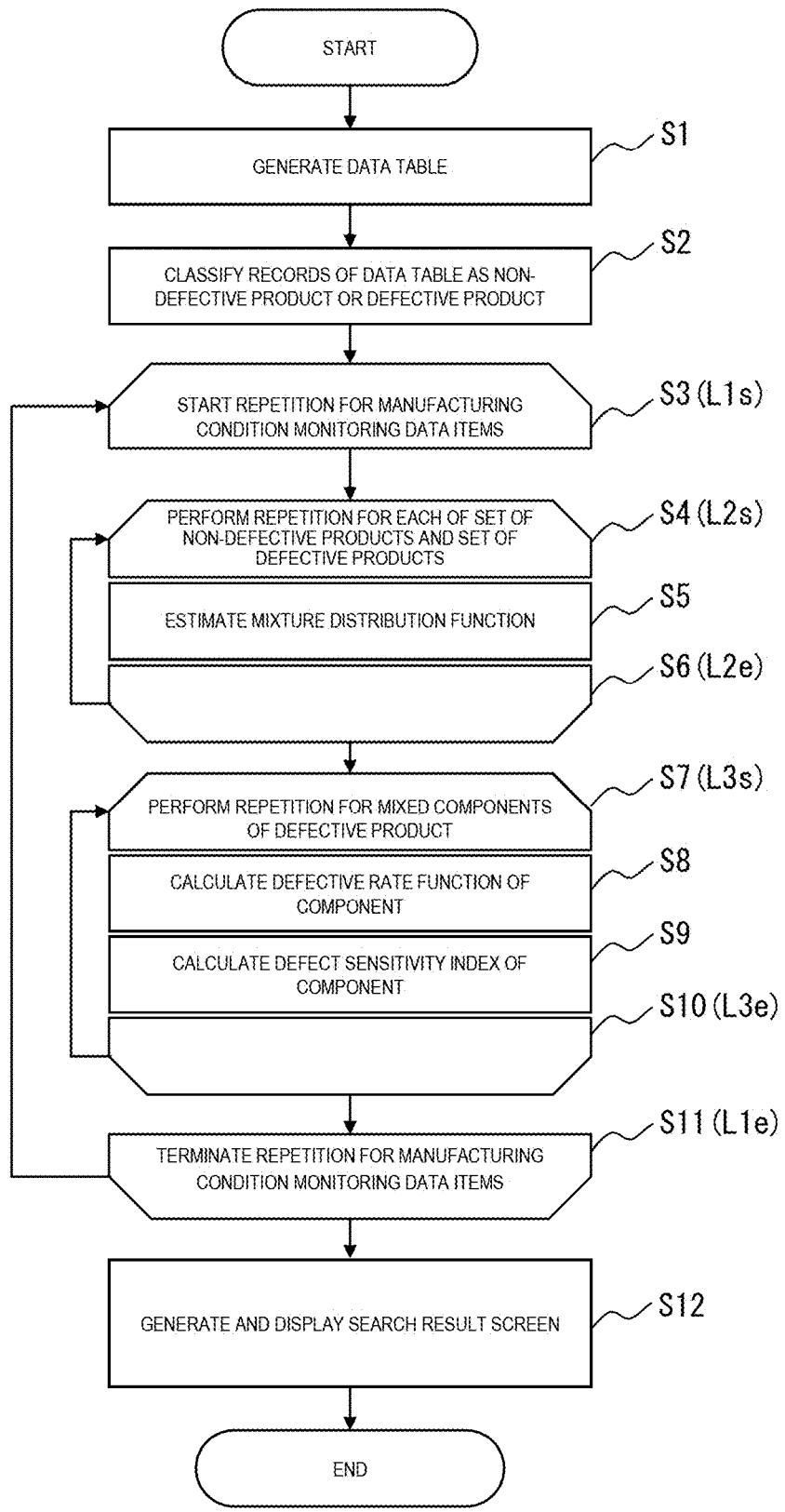
FIG. 2 is a flowchart explaining an example of manufacturing condition monitoring data defect factor item searching processing.

Next, FIG. 2 is a flowchart explaining an example of manufacturing condition monitoring data defect factor item searching processing performed by the manufacturing defect factor searching apparatus 10.

The manufacturing condition monitoring data defect factor item searching processing is processing for searching for a manufacturing condition monitoring data item serving as a factor that causes a product to be detected as a defective product in the final product inspection process 4d.

The manufacturing condition monitoring data defect factor item searching processing is performed periodically, for example, every day, every week, every month, or the like. Alternatively, the manufacturing condition monitoring data defect factor item searching processing may be performed in a case where a defective product has been detected in the final product inspection process 4d. It is assumed that the manufacturing monitoring data 151 and the final product inspection data 152 have already been stored in the storage unit 15.

First, the preprocessing unit 112 associates the manufacturing condition monitoring data 151a of the manufacturing monitoring data 151 and the final product inspection data 152 that have been stored in advance in the storage unit 15, on the basis of identification information (a product number) of each product, generates the data table 300 (FIG. 3), and transitorily stores the data table 300 in the storage unit 15 (step S1).

FIG. 3 illustrates an example of the data table 300 generated in step S1. The data table 300 includes a product number field 301, a manufacturing condition monitoring data item field 302, and a final product inspection result field 303. In the data table 300, a value of a plurality of manufacturing condition monitoring data items and a final product inspection result are recorded as a record of each manufactured product in association with a product number.

Note that an intermediate product inspection data item field may be added to the data table 300, and an inspection result of an intermediate product inspection data item may be recorded in association with a product number. Then, a manufacturing defect factor search may be performed for the intermediate product inspection data item.

Note that in a case where the final product inspection data 152 is numerical data indicating a degree of defectiveness/non-defectiveness of a final product, the preprocessing unit 112 compares the numerical data serving as the final product inspection data 152 with a threshold for determination of a defective product, performs binarization to indicate a non-defective product or a defective product in accordance with a comparison result, and records a result in the final product inspection result field 303. In a case where the final product inspection data 152 is binary data indicating a non-defective product or a defective product, it is sufficient if the final product inspection data 152 is recorded with no change in the final product inspection result field 303.

Return to FIG. 2. Next, the preprocessing unit 112 classifies records of the data table 300 into the set of non-defective products and the set of defective products on the basis of the final product inspection results (non-defective products or defective products) of the data table 300 (step S2). In each of the sets after classification, a product number is an element.

Next, the supervision unit 111 starts a first loop L1 (steps S3 to S11). At the start of the first loop L1, the supervision unit 111 sequentially focuses on one item at a time of a plurality of manufacturing condition monitoring data items ($x\_1, x\_2, \ldots, x\_p$) (step S3).

Next, the supervision unit 111 controls the mixture distribution function estimation unit 113, and starts a second loop L2 (steps S4 to S6). In a first cycle of the second loop L2, the mixture distribution function estimation unit 113 focuses on the set of non-defective products of the data table 300 (step S4), and estimates a mixture distribution function for a frequency distribution of a non-defective product (step S5). Thereafter, the processing returns to step S4 (step S6). In a second cycle of the second loop L2, the mixture distribution function estimation unit 113 focuses on the set of defective products of the data table 300 (step S4), and estimates a mixture distribution function for a frequency distribution of a defective product (step S5).

The mixture distribution function is a function obtained by using arbitrary existing distribution functions as element components and calculating the sum of a component group at a ratio specified by a mixing rate parameter. As a distribution function serving as an element component, for example, a normal distribution function can be employed. Parameters to be estimated in a mixture normal distribution function are parameters (the number of mixed components, a mixing rate parameter, and a position parameter (a mean) and a scale parameter (a standard deviation) of each normal distribution component) of the mixture normal distribution function, and a latent variable indicating a belonging component of each data point. As an estimation method, it is sufficient if various machine learning methods (k-means clustering, the expectation-maximization method, variational inference, or the Markov Chain Monte Carlo method) are arbitrarily employed.

After two cycles of the second loop L2, the supervision unit 111 controls the defect sensitivity index calculation unit 115, and starts a third loop L3 (steps S7 to S10). At the start of the third loop L3, the supervision unit 111 sequentially focuses on each component k of the mixture distribution function of the set of defective products (step S7). Next, the defect sensitivity index calculation unit 115 calculates a component defective rate function for component k by using Mathematical Formula (1) described below (step S8).

Component defective rate function (value of monitoring item $x$,component $k$)=component distribution function (value of monitoring item $x$,component $k$) of defective product/(component distribution function (value of monitoring item $x$,component $k$) of defective product+mixture distribution function (value of monitoring item $x$) of non-defective product) (1)

Next, the defect sensitivity index calculation unit 115 calculates a defect sensitivity index indicating a defect sensitivity of component k (step S9).

It is sufficient if a correlation between a defective rate function curve and a value of a manufacturing condition monitoring data item, a defective rate maximum value in a confidence interval of a distribution, a defect prediction accuracy obtained from the genuineness of a defect of a product included in a defect prediction interval having a great value of the defective rate function curve and the number of prediction positive/negative sections, a defect prediction recall ratio, or an F-value serving as a harmonic mean of the defect prediction accuracy and the defect prediction recall ratio is used as the defect sensitivity index.

Figure 4A:
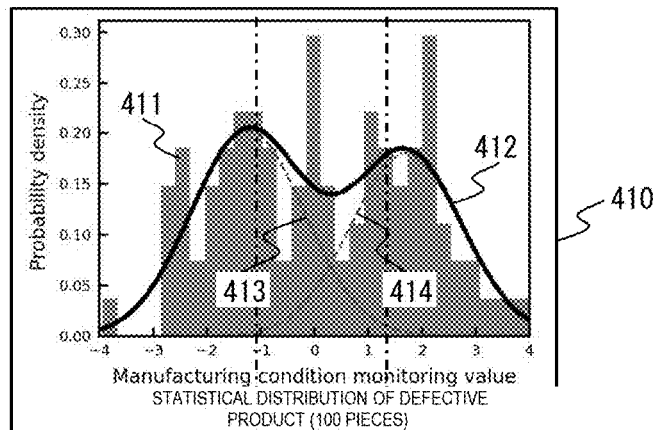
FIGS. 4A to 4C are diagrams for explaining a method for calculating a defect sensitivity index.
Figure 4B:
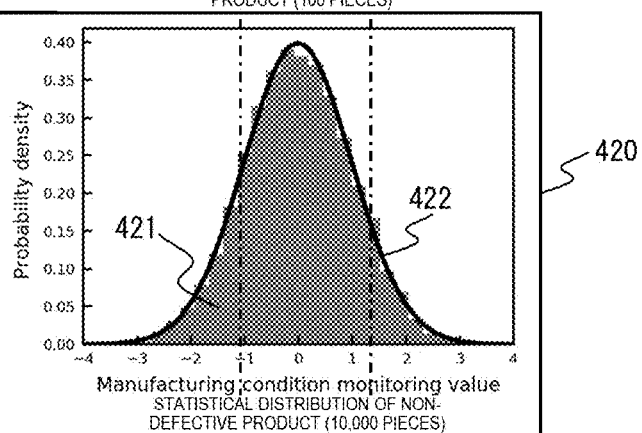
Figure 4C:
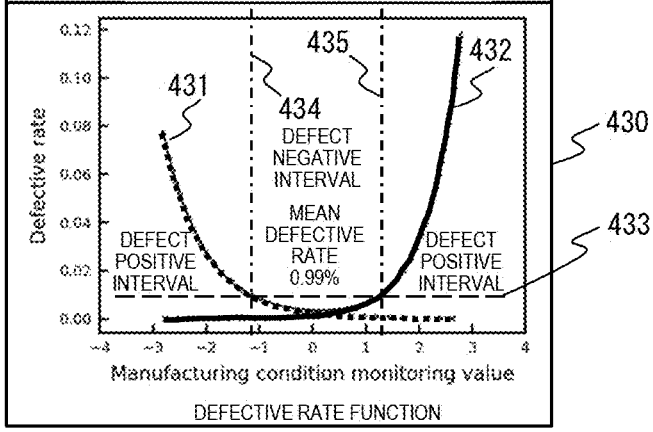

Here, a method for calculating the defect sensitivity index is specifically described. FIGS. 4A to 4C are diagrams for explaining the method for calculating the defect sensitivity index.

FIG. 4A is a statistical distribution 410 of 100 defective products that correspond to a predetermined one item of manufacturing condition monitoring data items, and illustrates a normalized frequency distribution 411 of a defective product, a mixture normal distribution function 412 that has been estimated to approximate the frequency distribution 411, and two resolved component functions 413 and 414 obtained by solving the mixture normal distribution function 412 into components.

FIG. 4B is a statistical distribution 420 of 10000 non-defective products that correspond to the same one item as the item in the case of FIG. 4A from among manufacturing condition monitoring data items, and illustrates a normalized frequency distribution 421 of a non-defective product, and a mixture normal distribution function 422 that has been estimated to approximate the frequency distribution 421. Note that in the case of FIG. 4B, the normalized frequency distribution 421 of a non-defective product can precisely approximated by one normal distribution function, and therefore the number of mixed components of the mixture normal distribution function 422 has been degenerated to 1.

FIG. 4C illustrates a defective rate function 430 for each component that has been calculated according to Mathematical Formula (1), and component defective rate function curves 431 and 432 obtained by resolving the defective rate function 430 into components.

Note that the resolved component functions 413 and 414 of FIG. 4A and the mixture normal distribution function 422 of FIG. 4B have been normalized, and therefore a distribution function value of FIG. 4A has been corrected at a ratio of the number of defective products to the total number of products (=0.99%) in a process of calculating Mathematical Formula (1).

As illustrated in FIG. 4B, a distribution of a non-defective product is concentrated in the center of an interval. In contrast, as illustrated in FIG. 4A, a distribution of a defective product has the center of gravity at both ends of an interval. Therefore, as illustrated in FIG. 4C, the entirety of the defective rate function 430 that has not been resolved into components is a U-shaped curve that protrudes downward. In this case, a correlation between the defective rate function 430 and the manufacturing condition monitoring data has a small value of about 0.16. Therefore, even if a value of a correlation with the defective rate function 430 that has not been resolved into components is used as an index, a manufacturing condition monitoring data item of interest fails to be extracted as a significant item for a manufacturing defect.

In contrast, the component defective rate function curve 431 obtained by resolving the defective rate function 430 into components monotonously decreases, and the component defective rate function curve 432 monotonously increases. Therefore, a component resolution correlation with the manufacturing condition monitoring data increases. Specifically, a component resolution correlation between the component defective rate function curve 431 and the manufacturing condition monitoring data is about −0.78, and a component resolution correlation between the component defective rate function curve 432 and the manufacturing condition monitoring data is about 0.71. Therefore, a manufacturing condition monitoring data item of interest can be extracted as a significant item for a manufacturing defect at a higher rank.

Furthermore, the component resolution correlation between the component defective rate function curve 431 and the manufacturing condition monitoring data and the component resolution correlation between the component defective rate function curve 432 and the manufacturing condition monitoring data have signs different from each other, and therefore a clue of different defect factors is also obtained. Furthermore, a defective rate maximum value in a confidence interval of the component defective rate function curve 431 is about 8%, a defective rate maximum value in a confidence interval of the component defective rate function curve 432 is about 12%, and they are greater than a mean defective rate 433 of 0.99% (=100 pieces/(100 pieces+ 10000 pieces)). Therefore, this maximum value may be used as a defect sensitivity index.

Moreover, as other examples of a defect sensitivity index that can be employed, a defect prediction accuracy obtained from the genuineness of a defect of a product included in a defect prediction interval having a great value of a defective rate function curve and the number of prediction positive/negative sections, a defect prediction recall ratio, and an F-value serving as a harmonic mean of the defect prediction accuracy and the defect prediction recall ratio are described.

It is assumed that intervals in which a defective rate indicated by the component defective rate function curve 431 or 432 illustrated in FIG. 4C exceeds the mean defective rate 433 are defect positive intervals (an interval on a left-hand side of an alternating long and short dashed line 434 and an interval on a right-hand side of an alternating long and short dashed line 435) of each component. In contrast, it is assumed that an interval in which the defective rate indicated by the component defective rate function curve 431 or 432 falls below the mean defective rate 433 is a defect negative interval (an interval between the alternating long and short dashed line 434 and the alternating long and short dashed line 435). In a case where it is assumed that the number of defective products that fall under the defect positive interval for each of the components is a true-positive (TP) number and the number of non-defective products that fall under the defect positive interval is a false-positive (FP) number, a defect prediction accuracy can be obtained according to Mathematical Formula (2) described below.

$$\text{Defect prediction accuracy} = TP/(TP+FP) \quad (2)$$

In the case of FIG. 4C, a defect prediction accuracy of the entirety of the defective rate function 430 is about 2.7%, a defect prediction accuracy of the component defective rate function curve 431 is about 2.4%, and a defect prediction accuracy of the component defective rate function curve 432 is about 3.2%. When it is assumed that the number of defective products that deviate from the defect position interval is a true-negative (TN) number, a defect prediction recall ratio can be obtained according to Mathematical Formula (3) described below.

$$\text{Defect prediction recall ratio} = TP/(TP+TN) \quad (3)$$

In the case of FIG. 4C, a defect prediction recall ratio of the entirety of the defective rate function 430 is about 61%, a defect prediction recall ratio of the component defective rate function curve 431 is about 54%, and a defect prediction recall ratio of the component defective rate function curve 432 is about 68%. An F-value can be obtained from a harmonic mean (the reciprocal of a reciprocal mean value) of the defect prediction accuracy and the defect prediction recall ratio, that is, according to Mathematical Formula (4) described below.

$$F\text{-value} = TP/(TP+(FP+TN)/2) \quad (4)$$

In the case of FIG. 4C, an F-value of the entirety of the defective rate function 430 is about 5.1%, an F-value of the component defective rate function curve 431 is about 4.6%, and an F-value of the component defective rate function curve 432 is about 6.0%. Therefore, it is apparent that the F-value of the component defective rate function curve 432 is greater than the F-value of the component defective rate function curve 431, and this can be used as a clue for determining a priority order of countermeasures.

Return to FIG. 2. After a defect sensitivity index indicating a defect sensitivity of component K of interest has been calculated, as described above, the processing returns to step S7 (step S10), and the third loop L3 is repeated until all of the components K of the mixture distribution function of the set of defective products have been focused on. By doing this, defect sensitivity indices of all of the components k of the mixture distribution function of the set of defective products are calculated.

Next, until the supervision unit 111 has focused on all of the manufacturing condition monitoring data items, the processing returns to step S3 (step S11), and the first loop L1 is repeated. By doing this, a defect sensitivity index of each of the components k is calculated with respect to all of the manufacturing condition monitoring data items.

Note that the component resolution correlation described above that serves as a defect sensitivity index of component k indicates that the frequency of occurrence of a defective product has a relationship with the magnitude of a manufacturing condition, and the component resolution correlation can be used as an index for extracting an item that makes it easy to propose and apply countermeasures against the occurrence of a defective product. However, in some cases, the component resolution correlation indicates a high correlation, although an item is only applied to a very small number of defective products. Therefore, a noise item having a small countermeasure effect is easily extracted.

In contrast, the component resolution F-value described above can be used as an index for extracting an item that increases the number of defective products that can be explained according to a component defective rate, that is, an item having a large countermeasure effect. However, by using the component resolution F-value, a noise item that is difficult to take countermeasures is easily extracted.

Accordingly, it is effective that a combination of the component resolution correlation and the component resolution F-value is used as an index for extracting an item having a large countermeasure effect. Note that defect sensitivity indices to be combined are not limited to the component resolution correlation and the component resolution F-value, and other defect sensitivity indices may be combined.

Next, the screen generation unit 117 generates a list obtained by sorting combinations of a manufacturing condition monitoring data item and a mixed component in descending order of the defect sensitivity index. Specifically, a list obtained by using, as a target, a group of manufacturing condition monitoring data items having a component resolution correlation that is greater than or equal to a predetermined value and sorting the group in descending order of the component resolution F-value is generated. Moreover, the screen generation unit 117 stores the generated list as the calculation result data 154 in the storage unit 15, generates the search result screen 500 (FIG. 5), and causes the display unit 14 to display the search result screen 500 (step S12). By doing the above, manufacturing condition monitoring data defect factor item searching processing performed by the manufacturing defect factor searching apparatus 10 is terminated.

FIG. 5 illustrates a display example of the search result screen 500 to be displayed on the display unit 14 as a result of manufacturing condition monitoring data defect factor item searching processing.

The search result screen 500 is provided with a factor candidate list region 510, a selected item region 512, a defect sensitivity index region 513, and statistical distribution regions 515, 516, and 517.

In the factor candidate list region 510, a list obtained by sorting manufacturing condition monitoring data items having a component resolution correlation that is greater than or equal to a predetermined value in descending order of the component resolution F-value is displayed. The factor candidate list region 510 is provided with a selection button 510*a* and a scroll button 510*b*.

A user operates the scroll button 510*b* so that a list of manufacturing condition monitoring data items that is displayed in the factor candidate list region 510 can be scrolled vertically. Furthermore, a user selects any button of the selection button 510*a* so that one of the manufacturing condition monitoring data items that are displayed in the form of a list can be selected. The case of FIG. 5 indicates a state where manufacturing condition x_1 having a fourth order has been selected.

In the selected item region 512, a manufacturing condition monitoring data item that has been selected in the factor candidate list region 510 is displayed. In the defect sensitivity index region 513, a correlation and an F-value of the entirety (ALL), and component resolution correlations and component resolution F-values are displayed as a defective sensitivity index that corresponds to the item that has been selected in the factor candidate list region 510. This enables a user to check an effect of component resolution. Note that defect sensitivity indices that are different from the correlation and the F-value may be displayed in the defect sensitivity index region 513.

In the statistical distribution region 515, a statistical distribution of a defective product that corresponds to the item that has been selected in the factor candidate list region 510 (a statistical distribution that is similar to the statistical distribution of FIG. 4A) is displayed. In the statistical distribution region 516, a statistical distribution of a non-defective product that corresponds to the item that has been selected in the factor candidate list region 510 (a statistical distribution that is similar to the statistical distribution of FIG. 4B) is displayed. In the statistical distribution region 517, a defective rate function and a component defective rate function curve that correspond to the item that has been selected in the factor candidate list region 510 (a defective rate function and a component defective rate function curve that are similar to the defective rate function and the component defective rate function curve of FIG. 4C) are displayed.

A user can check a list of manufacturing condition items having a higher defect sensitivity from among manufacturing monitoring data items, by using the search result screen 500. Moreover, by selecting one item from the list, a user can check a defect sensitivity index for the item in the form of a numerical value. Furthermore, a user can check a distribution of each of a non-defective product and a defective product in the form of a graph.

<Manufacturing Attribute Item Element Searching Processing Performed by Manufacturing Defect Factor Searching Apparatus 10>

Next, manufacturing attribute item element searching processing is described. The manufacturing attribute item element searching processing is processing for extracting a manufacturing attribute item that is short of compatibility due to a high defect sensitivity from among manufacturing attributes disposed in the manufacturing line 4, and elements of the manufacturing attribute item.

Figure 6:
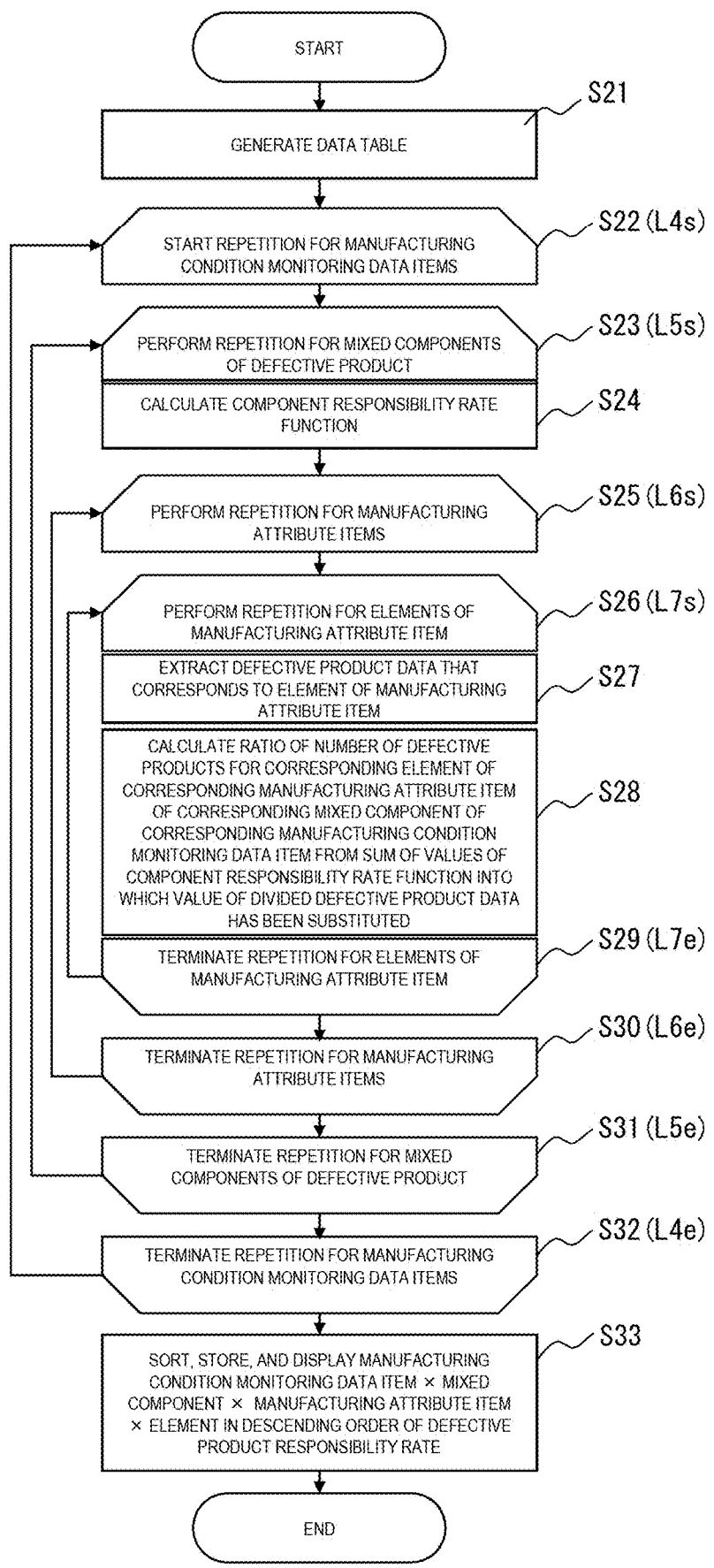
FIG. 6 is a flowchart explaining an example of manufacturing attribute item element searching processing.

FIG. 6 is a flowchart explaining an example of manufacturing attribute item element searching processing performed by the manufacturing defect factor searching apparatus 10.

Manufacturing attribute item element searching processing is performed after the manufacturing condition monitoring data defect factor item searching processing described above has been performed.

First, the preprocessing unit 112 associates the manufacturing condition monitoring data 151*a* and the manufacturing attribute used element history data 151*c* of the manufacturing monitoring data 151, and the final product inspection data 152 that have been stored in advance in the storage unit 15, generates a data table 700 (FIG. 7), and transitorily stores the data table 700 in the storage unit 15 (step S21).

FIG. 7 illustrates an example of the data table 700 generated in step S21. The data table 700 includes a product number field 701, a manufacturing condition monitoring data item field 702, a manufacturing attribute item field 703, and a final product inspection result field 704. In the data table 700, a plurality of manufacturing condition monitoring data items, a manufacturing attribute item, and a final product inspection result are recorded as a record of each manufactured product in association with a product number. In the example of FIG. 7, in the manufacturing attribute item field 703, one item, manufacturing attribute a, is provided, and element a_1 or element a_2 of manufacturing attribute a is recorded. However, the number of manufacturing attribute items or the number of elements is not limited to the example of FIG. 7.

Note that the data table 700 is substantially a data table obtained by adding the manufacturing attribute item field 703 to the data table 300 (FIG. 3). Accordingly, the data table 700 may be generated by diverting the data table 300 that has been generated in manufacturing condition monitoring data defect factor item searching processing. Furthermore, the data table 700 may be generated in step S1 of the manufacturing condition monitoring data defect factor item searching processing described above, and step S21 of manufacturing attribute item element searching processing may be omitted.

Next, the supervision unit 111 starts a fourth loop L4 (steps S22 to S32). At the start of the fourth loop L4, the supervision unit 111 sequentially focuses on one item at a time of a plurality of manufacturing condition monitoring data items (x_1, x_2, ... , x_p) (step S22).

Next, the supervision unit 111 starts a fifth loop L5 (steps S23 to S31). At the start of the fifth loop L5, the component responsibility rate function calculation unit 116 sequentially focuses on a component distribution function (for example, the resolved component function 413 or 414 in FIG. 4A) obtained by resolving, into components, a mixture distribution function (for example, the mixture normal distribution function 412 in FIG. 4A) that has been estimated for a frequency distribution of a defective product (for example, the frequency distribution 411 of a defective product in FIG. 4A) with respect to a manufacturing condition monitoring data item of interest (step S23). Next, the component responsibility rate function calculation unit 116 calculates a responsibility rate function of component k with respect to a manufacturing condition monitoring data item of interest in accordance with the definition of Mathematical Formula (5) described below (step S24).

$$\text{Component responsibility rate function (value of monitoring item } x, \text{component } k) = \text{(component distribution function (value of monitoring item } x, \text{component } k) \text{ of defective product)/(sum of all components of component distribution function (value of monitoring item } x, \text{component } k) \text{ of defective product)} \quad (5)$$

Next, the supervision unit 111 starts a sixth loop L6 (steps S25 to S30). At the start of the sixth loop L6, the supervision unit 111 sequentially focuses on one item at a time of manufacturing attribute items (step S25).

Next, the supervision unit 111 starts a seventh loop L7 (steps S26 to S29). At the start of the seventh loop L7, the supervision unit 111 sequentially focuses on one element at a time of elements a_i with respect to a manufacturing attribute item of interest (step S26).

Next, the component responsibility rate function calculation unit 116 extracts a record indicating a defective product that corresponds to a manufacturing attribute element of interest from the data table 700 (step S27). Next, the component responsibility rate function calculation unit 116 counts the number of extracted records, that is, the number of defective products, substitutes a value of manufacturing condition monitoring data item x of interest in the component responsibility rate function (Mathematical Formula 5), and obtains the sum of a group of products. Therefore, the component responsibility rate function calculation unit 116 calculates a defective product responsibility rate of manufacturing attribute element a_i of interest, that is, a probabilistic ratio of the number of defective products manufactured by using the element a_i, with respect to mixed component k of manufacturing condition monitoring data item x of interest (step S28).

Next, the processing returns to step S26 (step S29), and the supervision unit 111 repeats the seventh loop L7 until the supervision unit 111 has focused on all of the elements a_i of a manufacturing attribute of interest. By doing this, a defective product responsibility rate is calculated for each of all of the elements a_i of the manufacturing attribute of interest.

Next, the supervision unit 111 repeatedly performs the sixth loop L6, the fifth loop L5, and the fourth loop L4 in this order (steps S30 to S32). Finally, a defective product responsibility rate is calculated for all of the elements of all of the manufacturing attribute items with respect to all of the mixed components (a component distribution function) of a defective product of all of the manufacturing condition monitoring data items.

Next, the screen generation unit 117 generates a list obtained by sorting combinations of a manufacturing condition monitoring data item, a mixed component, a manufacturing attribute item, and an element of the manufacturing attribute item in descending order of the defective product responsibility rate. Moreover, the screen generation unit 117 stores the generated list as the calculation result data 154 in the storage unit 15, generates a search result screen 800 (FIG. 8), and causes the display unit 14 to display the search result screen 800 (step S33). By doing the above, manufacturing attribute item element searching processing performed by the manufacturing defect factor searching apparatus 10 is terminated.

FIG. 8 illustrates a display example of the search result screen 800 to be displayed on the display unit 14 as a result of manufacturing attribute item element searching processing.

The search result screen 800 is provided with a factor candidate list region 810, a selected item region 811, a manufacturing attribute item selection region 812, and a defective product responsibility number region 813.

In the factor candidate list region 810, a list obtained by sorting manufacturing condition monitoring data items in descending order of a defective product responsibility rate of an element in a manufacturing attribute, that is, in order of a greatest bias in the defective product responsibility rate, is displayed. In the factor candidate list region 810, a selection button 810a and a scroll button 810b are provided.

A user operates the scroll button 810b so that a list of manufacturing condition monitoring data items that is displayed in the factor candidate list region 810 can be scrolled vertically. Furthermore, a user selects any button of the selection button 810a so that one of the manufacturing condition monitoring data items that are displayed in the form of a list can be selected. The case of FIG. 8 indicates a state where manufacturing condition x_1 having a fourth order has been selected. In the selected item region 811, the manufacturing condition monitoring data item that has been selected in the factor candidate list region 810 is displayed.

In the manufacturing attribute item selection region 812, a manufacturing attribute item is displayed in a pulling-down manner, and a user can select a manufacturing attribute. Note that, in the manufacturing attribute item selection region 812, a manufacturing attribute item (in the example of FIG. 8, "device group a") that has a greatest bias in the defective product responsibility rate with respect to a manufacturing condition selected in the factor candidate list region 810 is displayed as an initial value.

In the defective product responsibility number region 813, a defective product responsibility number and a defective product responsibility rate are displayed for all of the elements (ALL) and a specified element (a_1 or a_2) of a manufacturing attribute selected in the manufacturing attribute item selection region 812. The presence/absence of a bias in the defective product responsibility rate can be checked in the defective product responsibility number region 813.

A user can search for a manufacturing condition monitoring data item having a high sensitivity to the occurrence of a defective product, and a distribution component having a high sensitivity, by using the search result screen 500 (FIG. 5). Then, a user can search for a manufacturing attribute item having a high sensitivity to the occurrence of a defective product, and elements of the manufacturing attribute item, by using the search result screen 800 (FIG. 8). This enables a user to efficiently search for a manufacturing defect factor.

Variation Examples

In the manufacturing condition monitoring data defect factor item searching processing and the manufacturing attribute item element searching processing that have been described above, one item of items of multivariate manufacturing monitoring data is sequentially focused on, and a one-dimensional mixture distribution function is estimated for a one-dimensional statistical distribution. In a variation example, expansion may be performed in such a way that two or more items of items of multivariate manufacturing monitoring data are sequentially focused on and a multi-dimensional mixture distribution function is estimated for a multi-dimensional statistical distribution.

FIG. 9 illustrates an example in a case where two items of items of multivariate manufacturing monitoring data are sequentially focused on and a two-dimensional mixture distribution function is estimated for a two-dimensional statistical distribution.

Figure 9A:
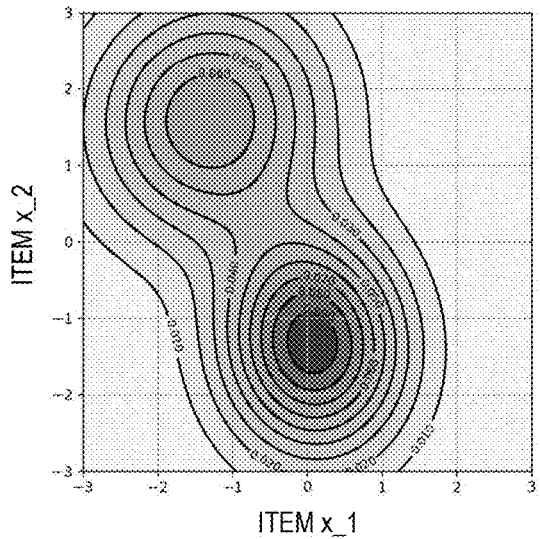
FIGS. 9A to 9D are diagrams for explaining a variation example.

FIG. 9A illustrates a frequency distribution of a defective product by using contour lines. A horizontal axis indicates a component of item $x\_1$, and a vertical axis indicates a component of item $x\_2$. FIG. 9B illustrates two two-dimensional resolved component functions 911 and 912 obtained by estimating a two-dimensional mixture distribution function for the frequency distribution of the defective product illustrated in FIG. 9A and resolving the estimated two-dimensional mixture distribution function into components.

Figure 9C:
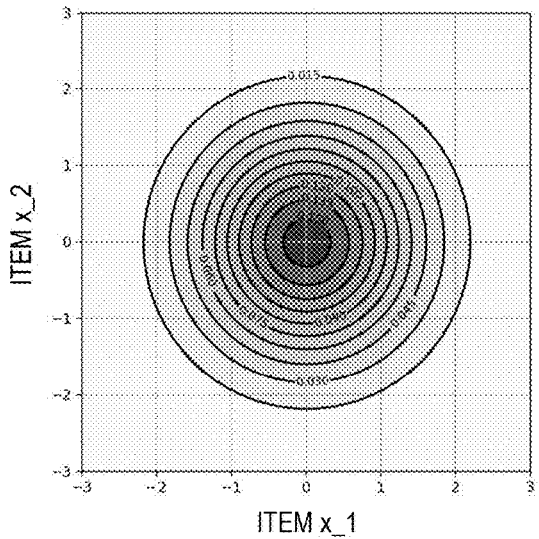
Figure 9B:
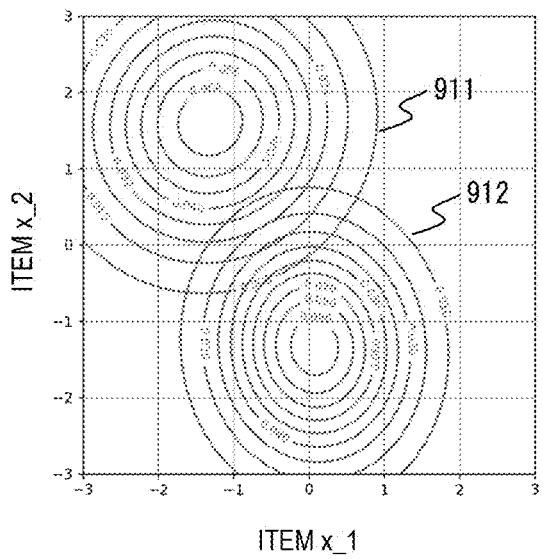
Figure 9D:
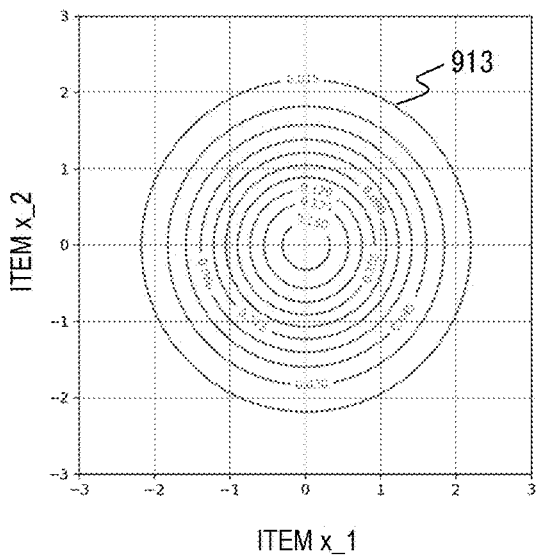

FIG. 9C illustrates a frequency distribution of a non-defective product by using contour lines. A horizontal axis indicates a component of item $x\_1$, and a vertical axis indicates a component of item $x\_2$. FIG. 9D illustrates a two-dimensional mixture distribution function (a two-dimensional normal distribution function) 913 that has been estimated for the frequency distribution of the non-defective product illustrated in FIG. 9C. However, in the case of FIG. 9D, precise approximation can be performed by using one two-dimensional normal distribution function, and therefore the number of mixed components has been degenerated to 1.

In the resolved component function 911 of a defective product illustrated in FIG. 9B, both a vertical-axis component and a horizontal-axis component of the coordinates of a center position of the resolved component function 911 are apart from the origin (0, 0) of a center position of the two-dimensional normal distribution function 913 of a non-defective product illustrated in FIG. 9D. Therefore, it is apparent that the resolved component function 911 of the defective product has a defective product sensitivity for two items ($x\_1$ and $X\_2$).

In contrast, in the resolved component function 912 of a defective product illustrated in FIG. 9B, a vertical-axis component of the coordinates of a center position of the resolved component function 912 is apart from the origin (0, 0) of the center position of the two-dimensional normal distribution function 913 of the non-defective product illustrated in FIG. 9D, but a horizontal-axis component is not apart from the origin. Therefore, it is apparent that the resolved component function 912 of the defective product only has a defective product sensitivity for item $X\_2$. This separation in a defective product sensitivity is important information in taking countermeasures against a manufacturing defect.

Furthermore, if Mathematical Formula (1) is expanded to two dimensions, and the two-dimensional resolved component functions 911 and 912 of the defective product are divided by a value obtained by adding the two-dimensional normal distribution function 913 of the non-defective product to the two-dimensional resolved component functions 911 and 912 of the defective product, a two-dimensional component defective rate function can be obtained. By using the two-dimensional component defective rate function, a defect sensitivity index can be calculated similarly to the one-dimensional case described above, and a combination of manufacturing monitoring data items having a high defect sensitivity can be searched for.

Moreover, if Mathematical Formula (5) is expanded to two dimensions, a two-dimensional component responsibility rate function can be obtained. By using the two-dimensional component responsibility rate function, a manufacturing attribute having a high defect sensitivity and elements of the manufacturing attribute can be searched for similarly to the one-dimensional case described above.

A two-dimensional example in which two items of manufacturing condition data have been combined has been described above. However, expansion may be performed to multi-dimensions obtained by combining three or more items of manufacturing condition data.

The present invention is not limited to the embodiment described above, and various variations can be made. For example, the embodiment above has been described in detail in order to make the present invention easily understandable, and the present invention is not necessarily limited to an embodiment including all of the configurations that have been described. Furthermore, part of a configuration of an embodiment can be replaced with or added to a configuration of another embodiment.

Furthermore, the respective configurations, functions, processing units, processing means, or the like that have been described above may be implemented by hardware, for example, by designing some or all of the respective configurations, functions, processing units, processing means, or the like by using, for example, an integrated circuit. Furthermore, the respective configuration, functions, or the like that have been described above may be implemented by software, by a processor analyzing and executing a program that achieves the respective functions. Information, such as a program, a table, or a file, that achieves the respective functions can be stored in a recording device such as a memory, a hard disk, or a solid state drive (SSD), or a recording medium such as an IC card, an SD card, or a DVD. Furthermore, control lines or information lines that are considered to be needed for convenience of explanation have been illustrated. Not all of the control lines or information lines in a product are illustrated. In practice, it may be considered that almost all of the configurations are mutually connected.

What is claimed is:
1. A manufacturing defect factor searching method comprising:
classifying manufacturing monitoring data into a set of non-defective products in which an inspection result indicates a non-defective product and a set of defective products in which the inspection result indicates a defective product, in accordance with a correspondence relationship between the manufacturing monitoring data and product inspection data, the manufacturing monitoring data being collected from a manufacturing line of a product and being multivariate, the product inspection data indicating the inspection result of the product manufactured in the manufacturing line;
estimating a mixture distribution function for each item of the manufacturing monitoring data, the mixture distribution function approximating to a statistical distribution of each of the set of non-defective products and the set of defective products;
resolving the mixture distribution function into components;

generating a list of items including a resolved component having a correlation with a manufacturing quality defect from among items of the manufacturing monitoring data; and calculating a manufacturing quality defective rate function for each of the components into which the mixture distribution function has been resolved, the manufacturing quality defective rate function defining a manufacturing quality detective rate with respect to a value of each of the items of the manufacturing monitoring data, wherein in the generating of the list, a list of the items of the manufacturing monitoring data is generated in accordance with the manufacturing quality defective rate; and calculating a defect sensitivity index of a resolved component of a statistical distribution of the items of the manufacturing monitoring data, by using the manufacturing quality defective rate function, wherein in the generating of the list, values of the defect sensitivity index are sorted in descending order, and the list of the items of the manufacturing monitoring data is generated.

2. The manufacturing defect factor searching method according to claim 1, wherein in the calculating of the defect sensitivity index, at least one of:

a defective rate function correlation between a value of the manufacturing quality defective rate function and a value of each of the items of the manufacturing monitoring data;

a maximum value of the manufacturing quality defective rate function in a confidence interval of the statistical distribution;

a defect prediction accuracy obtained from genuineness of a defect of the product included in a defect prediction interval having a great value of the manufacturing quality defective rate function and a number of prediction positive/negative sections;

a defect prediction recall ratio obtained from the genuineness of the defect of the product included in the defect prediction interval having a great value of the manufacturing quality defective rate function and the number of prediction positive/negative sections; and an F-value serving as a harmonic mean of the defect prediction accuracy and the defect prediction recall ratio is calculated as the defect sensitivity index.

3. The manufacturing defect factor searching method according to claim 1 wherein the manufacturing monitoring data includes manufacturing attribute data that includes a plurality of sets of manufacturing elements that are assumed to have compatibility for playing an identical role in the manufacturing line, a defective product responsibility rate of an element of an item of the manufacturing attribute data is calculated for each of the components into which the mixture distribution function has been resolved, and in the generating of the list, a list of a plurality of the items of the manufacturing attribute data is generated in accordance with the defective product responsibility rate.

4. The manufacturing defect factor searching method according to claim 3, wherein the plurality of the items of the manufacturing attribute data includes at least one of a supply source, a manufacturing device, an inspection device, and an operator.

5. The manufacturing defect factor searching method according to claim 1 further comprising:

displaying the list of the items of the manufacturing monitoring data, the list being generated in the generating of the list.

6. A manufacturing defect factor searching apparatus comprising:

a preprocessing unit that classifies manufacturing monitoring data into a set of non-defective products in which an inspection result indicates a non-defective product and a set of defective products in which the inspection result indicates a defective product, in accordance with a correspondence relationship between the manufacturing monitoring data and product inspection data, the manufacturing monitoring data being collected from a manufacturing line of a product and being multivariate, the product inspection data indicating the inspection result of the product manufactured in the manufacturing line;

a mixture distribution function estimation unit that estimates a mixture distribution function for each item of the manufacturing monitoring data, the mixture distribution function approximating to a statistical distribution of each of the set of non-defective products and the set of defective products;

a component resolution unit that resolves the mixture distribution function into components; and a screen generation unit that generates a list of items including a resolved component having a correlation with a manufacturing quality defect from among items of the manufacturing monitoring data;

a defect sensitivity index calculation unit that calculates a manufacturing quality defective rate function for each of the components into which the mixture distribution function has been resolved, the manufacturing quality defective rate function defining a manufacturing quality detective rate with respect to a value of each of the items of the manufacturing monitoring data, wherein the screen generation unit generates a list of the items of the manufacturing monitoring data in accordance with the manufacturing quality defective rate;

wherein:

the defect sensitivity index calculation unit calculates a defect sensitivity index of a resolved component of a statistical distribution of the items of the manufacturing monitoring data, by using the manufacturing quality defective rate function, and the screen generation unit sorts values of the defect sensitivity index in descending order, and generates the list of the items of the manufacturing monitoring data.

7. The manufacturing defect factor searching apparatus according to claim 6, wherein the defect sensitivity index calculation unit calculates, as the defect sensitivity index, at least one of:

a defective rate function correlation between a value of the manufacturing quality defective rate function and a value of each of the items of the manufacturing monitoring data;

a maximum value of the manufacturing quality defective rate function in a confidence interval of the statistical distribution;

a defect prediction accuracy obtained from genuineness of a defect of the product included in a defect prediction interval having a great value of the manufacturing quality defective rate function and a number of prediction positive/negative sections;

a defect prediction recall ratio obtained from the genuineness of the defect of the product included in the defect prediction interval having a great value of the manufacturing quality defective rate function and the number of prediction positive/negative sections; and an F-value serving as a harmonic mean of the defect prediction accuracy and the defect prediction recall ratio.

8. The manufacturing defect factor searching apparatus according to claim 6 wherein the manufacturing monitoring data includes manufacturing attribute data that includes a plurality of sets of manufacturing elements that are assumed to have compatibility for playing an identical role in the manufacturing line, a component responsibility rate function calculation unit is included, the component responsibility rate function calculation unit calculating a defective product responsibility rate of an element of an item of the manufacturing attribute data for each of the components into which the mixture distribution function has been resolved, and the screen generation unit generates a list of a plurality of the items of the manufacturing attribute data in accordance with the defective product responsibility rate.

* * * * *